(No Model.)
A. E. BROWN.
METHOD OF MEASURING THE WEIGHT OF LOADS.
No. 368,063. Patented Aug. 9, 1887.
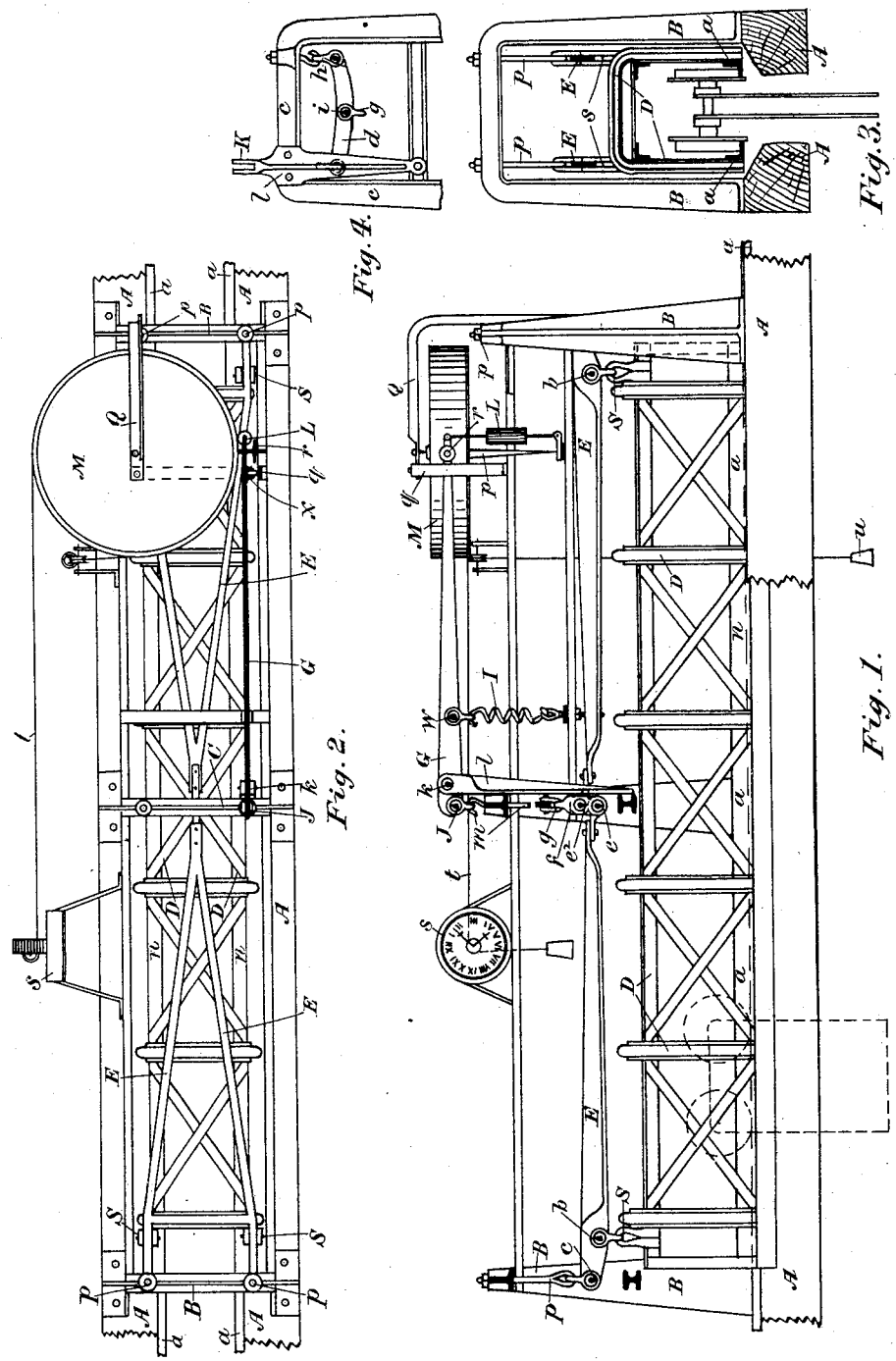
Witnesses,
W. J. Graham
H. Hansell
Inventor,
Alex. E. Brown
By J. N. McIntire
Att'y.

UNITED STATES PATENT OFFICE.

ALEXANDER E. BROWN, OF CLEVELAND, OHIO.

METHOD OF MEASURING THE WEIGHT OF LOADS.

SPECIFICATION forming part of Letters Patent No. 368,063, dated August 9, 1887.

Application filed March 5, 1887. Serial No. 229,806. (No model.)

*To all whom it may concern:*

Be it known that I, ALEXANDER E. BROWN, of Cleveland, in the county of Cuyahoga and State of Ohio, have invented a new and useful Method or System of Measuring the Weight of Loads; and I do hereby declare that the following is a full, clear, and exact description thereof, reference being had to the accompanying drawings, making part of this application.

My invention relates to a novel method or system of weighing loads, adapted more especially to the weighing of loaded or empty trucks, cars, &c., but applicable to the weighing of all sorts of loads; and it consists, essentially, in indicating and registering the weight or weights of one or more loads by a comparison of the movement of a registering device with the recorded movement of said device when previously moved or actuated by the application of a standard weight, all as will be hereinafter more fully explained, and as will be more particularly pointed out and defined in the claim of this specification.

Previous to my invention, in all the various forms of weighing contrivances the method or system embodied has been such as to necessarily involve the balancing or bringing to an equilibrium of some sort of device operated upon by the load to be weighed, or the employment of some sort of graduated scale to indicate the weight to be measured. In all such contrivances the system or systems thus necessarily involved have been more or less defective and unsatisfactory, especially when applied to the weighing in bulk of heavy loads, because of the changeableness or variations of any mechanism which can be employed under any such systems, and, furthermore, because of the impracticability of correctly ascertaining by such systems the aggregate of a series of loads weighed.

I propose by my invention to provide for use a system of weighing in which the defects and difficulties heretofore encountered will be successfully overcome, and by the use of which a series of loads may be weighed and the aggregate weight of the series ascertained with accuracy.

To enable those skilled in the art to which my invention relates to understand and practice my new system or method of weighing, I will now proceed to more fully describe it, referring by letters of reference to the accompanying drawings, which form part of this specification, and in which I have shown (in that form which now appears to me to be the best) the means or apparatus by which I am enabled to practice my said novel system.

In the drawings, Figure 1 is a side elevation, Fig. 2 a top or plan view, Fig. 3 an end view, and Fig. 4 a partial vertical cross-section, of an apparatus such as I have successfully employed in practicing my invention.

In the several figures of the drawings the same part will be found designated by the same letter of reference.

A A are the track-beams or elevated tramway, in connection with which I have practiced my present invention. At suitable distances apart on said tramway are erected and securely supported two metallic arches, B B, and also an intermediate arch, C, and at the locality between the arches B B the inner upper edges of the track-beams A are chamfered off, as most clearly seen by reference to Fig. 3.

D is a cage-like weighing-platform, composed, as shown, of a series of metallic arches, connected together by longitudinal brace-bars, (the whole being suitably cross-braced to give the cage rigidity,) and the lower inner ends of the arch-like pieces have securely fastened to them angle-irons $n$, (see Fig. 3,) which form a continuation of the interrupted track-irons $a$ of the tramway. These track-irons $n$ are adapted to receive and support the wheels O O of the conveying-machines shown at H, whenever the same may travel or pass from the track $a\ a$ of the tramway onto and over the track $n\ n$ of the platform or cage D. At Fig. 3 the wheels of the machine are shown as traveling upon the track-irons of the platform D. This track-platform is suspended at four points, and near each end, by suspension-loops $s$, which are hung upon hooks that are suspended at their eyes upon the knife-edged supports $b$ of two levers or scale-beams, E, that are in turn hung upon knife-edges at their outer ends, and which are supported at their adjacent and inner ends upon similar knife-edged supports in a manner to be presently explained. These levers or scale-beams E are each supported at the outer end upon knife-edged bearings $c$, which rest and bear in loops that are hooked into fixed suspenderrods $p$, that depend from the tops of the metallic arches B, all as best seen by reference to Fig. 1. The near and adjacent ends of said scale-beams E are supported by knife-edges $e$ and $e^2$, which have their bearings in the eyes of the loop or link $f$, the upper end of which is hooked into a pivoted link, $g$, that in turn rests upon a knife-edge, $i$, (see Fig. 4,) which is permanently secured to the middle part of the lever-arm $d$, one end of which is suspended by an articulation at $h$ from the top of the metallic frame C, and the other end of which is connected with a hook, $m$, to a loop which passes over the knife-edged journal J of the scale-beam G. This scale-beam G is pivoted at $k$ by a knife-edged journal in the upper end of a stand, $l$, which is securely bolted to and projects a short distance above the middle arch or metallic frame C, and between this pivotal connection $k$ and the end of the longer arm of the scale-beam G said scale-beam is pivoted by the knife-edged journal $w$ to a loop or link which is hooked to the upper end of a strong spiral spring, I, the lower end of which is anchored to a fixed part of the framework of the apparatus.

M is an indicator or register wheel, which is mounted to turn freely with or upon a vertical shaft, P, having a suitable step-bearing at its lower end and an upper bearing provided in the end of an angle iron or bracket, Q, the vertical leg of which is securely bolted to one of the metallic arches B. This drum is rotated continuously with a uniform motion by any suitable means, preferably by clock mechanism, such as shown at S, through the medium of a driving band or cord, $t$, which, after having passed partially around the periphery of said drum M, and thence over an idler at $r$, is provided at its lower end with a weight, $u$. This drum is designed to carry on its periphery an indicator-card or slip of paper, upon which are to be recorded, in a manner to be presently explained, the lines which indicate and register the weight or weights of the loads which may be placed upon the platform D, or which may travel over the same, and also the standard line or lines, by comparison of which, according to my new system, the record of the load or loads weighed is to be ascertained.

The outer end of the scale-beam G is connected by a suitable rod or piston, as shown at Fig. 1, with a dash-pot at L, designed to operate, preferably, with atmospheric air.

$q$ is a vertical guide bar or way, against the inner face of which travels an anti-friction roller, $x$, that is mounted to turn freely on a stud secured in a stand that projects laterally from the outer side or face of the scale-beam G near its outer end, for a purpose to be presently explained.

$r$ is a marker device or pencil suitably mounted near the end of beam G at a point about coincident with a radius of the wheel M—that is, at right angles to the vertical plane in which the beam G lies.

In the operation of the machine or apparatus herein shown and used, above described, for the purpose of carrying into effect my novel method or system of weighing, a standard weight of known capacity is either placed upon or passed over the suspended platform D as an initial operation or act for the purpose of recording on the periphery of the wheel M a line which may be properly designated as a standard of weight, by a comparison with which the lines to be made by the subsequent operations of the machine may be measured. Upon the placement of any such weight upon the platform D, or the passage over the platform of any such weight, said platform is caused to descend very slightly, and by such downward movement both of the levers or beams E E are caused to vibrate slightly upon their pivotal connections at $c$ and $b$, their inner adjacent ends acting in concert upon the double-eyed link-piece $f$, so as to depress said link, and thus through its connection with the central cross-lever, $d$, cause said lever to vibrate at one end upon its knife-edged pivot $g$ at the other end, and thus effect a slight downward pull upon the shorter arm of the scale-beam G. This downward movement of the shorter arm of the beam G causes the end of its longer arm of course to ascend, and in so doing the pencil-marker device at $r$ is caused to draw or mark upwardly on the periphery on the wheel M a line or mark of a certain length commensurate with the actual weight of the body placed upon or passing over the platform D.

It will be understood, of course, that the greater the weight of the body placed upon or made to pass over the platform D the farther will said platform be caused to descend, (against the counter-resistant spring-supporting device,) and hence the longer will be the mark or line made on the periphery of the wheel M by the marker device with the shorter arm of the beam G, and that hence just in proportion as the body to be weighed may be heavier or lighter will this mark be made longer or shorter.

Upon the releasement of the platform D of its burden said platform, through the medium of the powerful spiral spring I, is lifted or returned to its original position, during which movement the said pencil or marker device $r$ of course descends, making another line upon the periphery of wheel M equal in length to that during the ascent of said pencil. As the wheel M in the machine shown is constantly revolving, the lines thus made by the ascent and descent of the pencil will be slightly oblique, converging to an angle at their upper ends, and during the rotation of said wheel the said pencil, while the rest of the machine is standing still, will of course be caused to produce a circumferential and continuous mark upon the periphery of the wheel M or the indicator card or paper mounted thereon. Whenever, after this initial performance of the machine, with the use of a given or standard weight, other loads may be placed upon or passed in cars or trucks over the platform D, said platform and the other parts of the contrivance will repeat the operations just above explained and other sets or pairs of ascending and descending pencil marks or lines will be made upon the periphery of the drum M, such sets of marks being always commensurate, of course, with the weights of the respective loads placed upon or passed over the weighing-platform. By a comparison of such subsequently-made marks with the line or set of lines produced by the use of the standard weight, the exact weights, either separately or collectively, of all the subsequent loads applied to the platform D may be accurately ascertained.

In the use of my novel method or system of weighing, as I have so far practiced it with great success and advantage, it has been applied, through the medium of such a contrivance as shown and described, to the work of weighing and recording the weights of the numerous gross loads and tare loads conveyed or transported back and forth over the tramways of hoisting and conveying machines employed for handling large quantities of coal, ore, &c., either translated from vessels to cars or from either such receptacles to a pile on shore, or from one locality to another in mining operations, &c.; and in the use thus of my invention, through the aid of a machine such as shown and described, I have found it expedient to employ a standard or known weight or load by passing the same onto or over the platform D periodically—say three times per day—and to compare or measure the lines on the indicator-card made by the action of all the full and empty cars or buckets with either one of the lines made by such passages of the standard weight, or with an average line between said three lines whenever the slightest variation in length appears between the three lines thus made by the standard weight.

To ascertain the aggregate weight of the material actually passed over the platform D during the day, or during any given period, it is only necessary to take the longer lines or sets of lines on the indicator, representing the weight of the full cars or buckets, and adding them together or laying them off into a continuous line, subtract therefrom the continuous line formed by the addition of all the shorter lines, (made by the passage of the returning or empty receptacles,) subtract said aggregate of the shorter lines from the long line, and then compare the result by scale with the line of standard or known weight. By this means, it will be seen, I am enabled to accurately ascertain or determine the exact weight of the material passed over the platform D, and to consequently determine with perfection the weight delivered at any given place from the source of supply.

In the use of any scale contrivance made and operating upon any of the plans or methods known previous to my invention it has been impossible to ascertain any such aggregate of a series of loads weighed and delivered, except by a process of measuring by a scale and weight or spring each load, and then adding together the figures denoting such separate weights, and under such mode of operation the results have been inevitably, first, a considerable inaccuracy and changeableness in the ascertained weight of each load on account of the impracticability of weighing to a nicety with such known means, and, second, a multiplication of the inaccuracies of the separate transactions in adding them to get the aggregate of the loads weighed. By my novel method or system not only are these defects or inaccuracies entirely avoided, but, furthermore, all the time and labor necessary to the performance of such separate weighing operations are saved, so that by the use of my new method, carried into effect by such a contrivance as I have shown and described, or by any other which may answer the purpose, I am enabled to both do the required work, and at much less cost of time and labor, and to also do it with a degree of perfection hitherto unattainable.

Of course in practicing my new method or system of weighing loads the same may be carried into effect by some other means than that which I have devised and successfully employed for the purpose, which means I have made the subject of another application for Letters Patent, filed simultaneously with this one. I therefore wish it to be understood, of course, that the invention made the subject of this application is not necessarily dependent at all upon the use of precisely or even substantially such a machine or contrivance as I have herein shown and described.

What I claim as new, and desire to secure by Letters Patent, is—

As a new method of ascertaining the weights of loads or articles, causing each load (that is to be weighed) to actuate a suitable mechanism in such manner as to produce a mark or line upon any given surface, and subsequently comparing such line or mark so made with a line or mark produced by actuating such mechanism by a standard weight or load of predetermined gravity, all substantially as hereinbefore set forth.

In witness whereof I have hereunto set my hand this 31st day of August, 1886.

ALEXANDER E. BROWN.

In presence of—
  E. T. SCOVILL,
  CHAS. W. KELLY.